(12) United States Patent
Graham et al.

(10) Patent No.: US 7,267,836 B2
(45) Date of Patent: Sep. 11, 2007

(54) CREAMY FOODSTUFF AND METHOD FOR PRODUCTION THEREOF

(75) Inventors: Judith Graham, Müchen (DE); William Hanselmann, Hershey, PA (US)

(73) Assignee: Nestec S.A., Vevey (CH)

( * ) Notice: Subject to any disclaimer, the term of this patent is extended or adjusted under 35 U.S.C. 154(b) by 66 days.

(21) Appl. No.: 10/849,557

(22) Filed: May 18, 2004

(65) Prior Publication Data

US 2005/0013919 A1    Jan. 20, 2005

Related U.S. Application Data

(63) Continuation of application No. 10/621,359, filed on Jul. 18, 2003, which is a continuation of application No. PCT/EP02/00486, filed on Jan. 18, 2002.

(30) Foreign Application Priority Data

Jan. 24, 2001    (EP)    ................... 01101530

(51) Int. Cl.
*A23J 1/00*    (2006.01)
(52) U.S. Cl. ............... 426/656; 426/658; 426/659; 426/580; 426/564; 426/565; 426/570; 426/571; 426/572; 426/573
(58) Field of Classification Search ............... 426/656, 426/658, 659, 580, 564, 565, 570–573
See application file for complete search history.

(56) References Cited

U.S. PATENT DOCUMENTS

| | | | |
|---|---|---|---|
| 4,251,560 A | 2/1981 | Dell et al. .................. 426/565 |
| 4,282,262 A | 8/1981 | Blake ......................... 426/565 |
| 4,297,379 A | 10/1981 | Topalian et al. ............. 426/565 |
| 4,341,808 A | 7/1982 | Croyle ........................ 426/573 |
| 4,623,552 A * | 11/1986 | Rapp .......................... 426/575 |
| 5,034,235 A * | 7/1991 | Dunn et al. ................. 426/238 |
| 5,366,742 A | 11/1994 | Tuason, Jr. et al. .......... 426/96 |

FOREIGN PATENT DOCUMENTS

| | | |
|---|---|---|
| EP | 0 930 017 A1 | 7/1999 |
| GB | 1 484 167 | 9/1977 |
| GB | 2 313 286 A | 11/1997 |
| JP | 63 230 042 | 9/1988 |
| WO | WO98/47390 | 10/1998 |

* cited by examiner

*Primary Examiner*—Anthony Weier
(74) *Attorney, Agent, or Firm*—Bell, Boyd & Lloyd LLP

(57) ABSTRACT

The invention relates to a foodstuff having creamy to pasty characteristics having one or more biopolymers and water and having a homogeneous microstructure wherein the biopolymers are present in a very fine microscopic distribution and without discernible coarse clusters. This foodstuff is produced by mixing the constituents of the foodstuff to form a starting mixture of liquid to pasty consistency; cooling the starting mixture to a product temperature of below 0° C. with simultaneous continuous mixing and without aeration to produce a freeze-texturized homogenous mixture of the constituents of the foodstuff; and allowing the product temperature to rise to a distribution and consumption temperature of 4° C. and above.

10 Claims, 4 Drawing Sheets

CREAMY FOODSTUFF AND METHOD FOR PRODUCTION THEREOF

CROSS-REFERENCE TO RELATED APPLICATIONS

This application is a continuation of U.S. application Ser. No. 10/621,359 filed Jul. 18, 2003, which is a continuation of International Application PCT/EP02/00486 filed Jan. 18, 2002, the entire content of each of which is expressly incorporated herein by reference thereto.

BACKGROUND ART

The invention relates to a foodstuff with creamy to pasty characteristics which if desired can be converted into a foamed structure, and to a method for production of such foodstuffs.

It is frequently desirable to be able to offer a product having a creamy, full-bodied and smooth structure. This type product is desirable not only in the dessert sector, but also in the field of savory to spicy creams and pastes.

To have a creamy and more or less stiff structure, corresponding foodstuff mixtures to date either include high fat contents, for example in the form of cream, or gelling agents, in particular in the form of gelatin. Up to a certain degree, a creamy, fatty mouthfeel may also be simulated in certain recipes using special quality grades of starch.

Foodstuffs having relatively high fat contents and/or gelatin, which is a product of animal origin, are, however, frequently unwanted for dietetic reasons and/or reasons relating to their rejection by certain consumer groups. Thus there is a desire for products that have a semi-liquid to stiff, spoonable and, if appropriate, spreadable or pipable consistency, and that do not contain cream or gelatin.

In the field of foodstuffs marketed as cold products or shelf products having a creamy or foamed structure, for example in the case of foamed dessert creams and similar products, numerous recipes are known which, to achieve their desired consistency (rheology), do not necessarily have to contain fat, but which do contain, as structure-forming agents, starches and other polysaccharides or hydrocolloids, for example, alginates or plant gums, or proteins such as gelatin. These products, in the case of their production by the previously customary methods by simple thorough mixing and homogenizing their constituents, if appropriate accompanied by whipping, incorporation of air or gas, and development of their stiff structure in the final packing, generally do not have a structure which can be termed "creamy" in the usual sense. Depending on the recipe, the structure is rather to be described as gel-like to rough.

Thus, there is a need for creamy or smooth foodstuffs that do not contain gelatin or high fat contents, and these are provided by the present invention.

SUMMARY OF THE INVENTION

The present invention now provides foodstuffs with creamy to creamy-pasty characteristics in which the desired texture is not due to special recipe constituents, but is instead due to a particular production method. This method is versatile and can be applied to different recipes in order to produce foodstuffs having a particular novel characteristic which can be described as creamy, full-bodied and smooth.

The method which makes it possible to produce such foodstuffs is another embodiment of the invention.

Thus, the invention relates to a foodstuff having creamy to pasty characteristics comprising one or more biopolymers and water and having a homogeneous microstructure wherein the biopolymers are present in a very fine microscopic distribution and without discernible coarse clusters. This foodstuff is preferably produced by mixing the constituents of the foodstuff to form a starting mixture of liquid to pasty consistency; cooling the starting mixture to a product temperature of below 0° C. with simultaneous continuous mixing and without aeration to produce a freeze-texturized homogenous mixture of the constituents of the foodstuff; and allowing the product temperature to rise to a distribution and consumption temperature of 4° C. and above.

Generally, these foodstuffs also include aqueous constituents and other customary constituents which are selected from nutrients, flavorings, aromas, colorings, structure-forming agents and/or dietary fibers and have a particular homogeneous microstructure produced by freeze-texturizing, in which the biopolymers and fats are present in a very fine microscopic distribution. In particular, this microstructure is one which is obtained by, or is obtainable by, mixing the constituents of the foodstuff, forming a flowable starting mixture of liquid to pasty consistency, cooling the starting mixture to a product temperature of less than 0° C., preferably less than −3° C., and customarily about −5° C., with continuous mixing, producing a homogeneous mixture of all constituents, and allowing the resultant cold homogeneous mixture, if desired after packaging, to become warm so that its temperature rises to above 0° C., in particular above 4° C. and above.

Since the structural development termed freeze-texturizing in the context of the present application can be assigned to a rearrangement of constituents which are referred to herein as biopolymers, more precisely under the effect of a change in time of the availability of the free water present in the foodstuff, the biopolymers and the free water present in the foodstuff are to be considered the most essential functional constituents of the basic recipes of the foodstuffs which can be produced according to the invention. Since the finished foodstuffs, in addition, are not to be low-viscosity liquids, the amount of the biopolymers must be high enough that the finished homogenized foodstuff has the desired stiffness.

BRIEF DESCRIPTION OF THE DRAWING FIGURES

Other characteristics and advantages of the invention will become apparent from the following description of the preferred implementations of the invention, which is made with reference to the accompanying drawings, in which.

DETAILED DESCRIPTION OF THE PREFERRED EMBODIMENTS

Figure 1A:
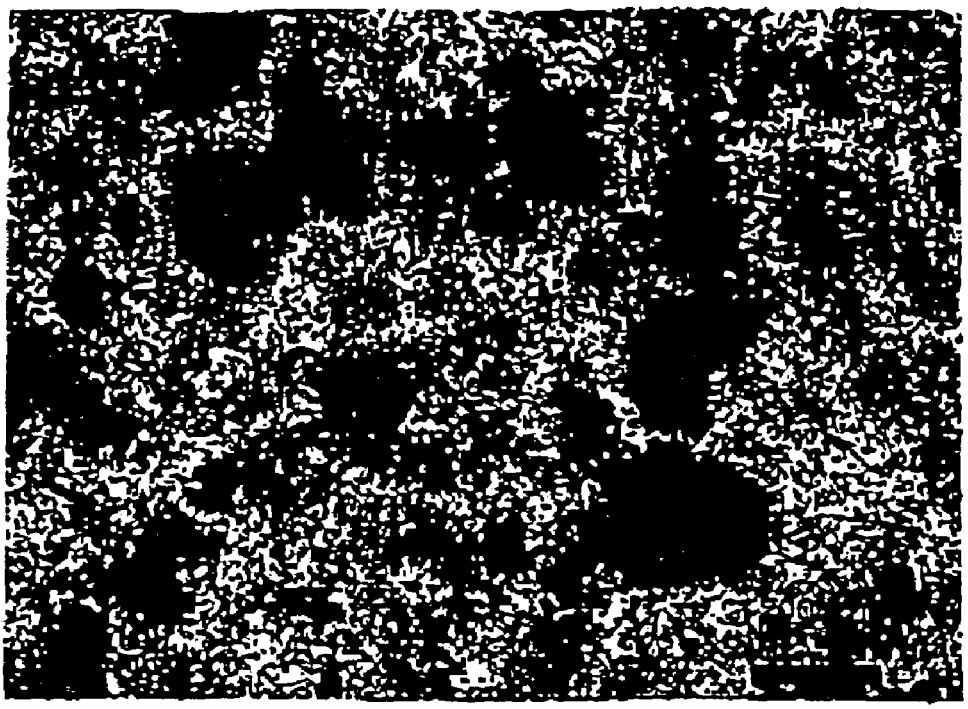
FIGS. 1a and 1b show light micrographs of two differently treated foodstuff products which were produced from the same starting mixture, the product according to FIG. 1a having been produced by the customary method by mixing the constituents, while the product according to FIG. 1b was produced according to the invention by freeze-texturizing.

"Biopolymers" in the context of the present application refer to polymers made of the edible polymeric building blocks occurring in nature. Primarily, this term comprises all types of proteins occurring in foodstuffs which are, in particular, milk proteins, but, if appropriate, also are proportions of hydrolyzed gelatin or egg protein, but can also be proteins of plant origin. In addition to proteins, the recipes of the inventive foodstuffs generally also comprise other constituents to be counted as biopolymers, more precisely, in particular, structure-forming agents in the form of polysaccharides, which are considered also to include the majority of hydrocolloids suitable for foodstuff purposes. Examples of suitable hydrocolloids which may be mentioned are products such as xanthan or carrageenan, or various plant gums, while other polysaccharide constituents which may be mentioned are in particular starches or celluloses or cellulose derivatives, for example a microcrystalline cellulose of food quality. The protein content in this case is generally in the range of 0.01-20% by weight, and the content of other biopolymers is generally in the range of 0.01-7% by weight.

The aqueous contents are introduced into the foodstuff generally as milk, in particular skimmed milk, or in the form of aqueous solutions of the other possible constituents of the basic foodstuff composition. The content of water, more precisely free water, in the starting mixture can vary over a wide range and is generally in the range of 50-95% by weight, in particular in the range of 70-90% by weight.

In addition to the constituents which can be termed "functional constituents", that is to say the biopolymers and the water, the foodstuffs generally further comprise customary other constituents which promote the food properties and/or consumer properties of the foodstuff. Without any claim as to completeness, these constituents include nutrients, for example fats and sugars, flavorings and aromas, for example sugars, sugar aromas, fruit aromas, alcohol or alcohol aromas, fruit extracts, salt, spacings and seasoning pastes and similar customary constituents. In addition, food constituents can be present which, depending on their function, can be termed thickeners, structure-forming agents or dietary fibers, and, obviously, the products can also comprise natural, nature-identical or synthetic colorings and other food additives, as are customary for foodstuffs of the inventive type. It is in addition provided that piece-formed constituents, for example fruit, vegetable, meat and/or fish pieces, can also be added to the various foodstuffs which can be prepared according to the invention.

According to the present invention, it has been found that foodstuffs which are obtained from known recipes and develop rather rough, flat structures by the customary process can also be given a creamy, smooth, full-bodied and shiny texture if the recipe constituents of the foodstuff are not, as was customary to date, only intensively mixed and, if desired, packaged. The mixture is then permitted to develop a desired more or less stiff structure, but this instead is first premixed in the usual manner with formation of a generally flowable starting mixture of liquid to pasty consistency, and the starting mixture formed is then subjected to the special treatment which is termed freeze-texturizing in the context of this application.

The structural development by freeze-texturizing is performed by the more or less homogeneous and, if desired, already sterilized starting mixture formed at room temperature being cooled with continuous intensive mixing, which can be performed by intensive stirring, to a temperature of below 0° C., in particular below −3° C., for example to −5° C. or below.

This cooling of a starting mixture with stirring can be performed in the manner known per se for the production of ice-cream. Ice-cream products, however, are whipped and deep-frozen and marketed in this state and consumed in the solid frozen state. They therefore also have compositions, in particular as regards the content of biopolymers, which are different from those of the inventive foodstuffs. If conventional ice-cream products are allowed to thaw with heating to temperatures of above 0° C., these generally become liquid and do not have a creamy stiff structure.

However, the inventive products, after the cooling carried out for the freeze-texturizing, are allowed to return to temperatures of above 0° C., more precisely cold products to temperatures of about 4-8° C., shelf products to room temperature, and the final products are desserts, ice-creams, mousse products or similar foams or pastes which are not marketed as frozen products, but which are marketed either chilled or else as simple shelf products and are consumed as products at room temperature. These products have a phase angle of at least 8 degrees over a frequency of between 0.1 and 1 Hz.

Surprisingly, it has been found that when a corresponding starting mixture is cooled with continuous intensive mixing to below a defined threshold temperature, which is critical for a defined foodstuff composition, a structural change in the sense of homogenization of the various foodstuff constituents, in particular the biopolymers, occurs which, when the product is warmed again, leads to a product having, for the starting recipe, novel characteristics which can be described as creamy, full-bodied, and shiny. The threshold temperature for the foodstuffs of the type claimed in the present application is generally from −3 to −8° C., where, for most foodstuffs, cooling to about −5° C. is suitable, the precise value of the threshold temperature, however, being dependent on the recipe or composition of the ingredients.

The structural change is described as follows, without any statement therewith on the subsequent theory:

On the basis of detailed accompanying studies of the various changes in characteristics, it may be assumed that, during cooling below the freezing point or below the characteristic threshold temperature for the respective foodstuff mixture, at least a part of the free water is frozen with formation of ice crystals and thus the amount of available free water in the foodstuff mixture is decreased to such an extent that the remaining constituents, that is to say in particular the proteins and other biopolymers, can become permanently differently ordered compared to the case of simple mixing in the presence of the total amount of the water, the ordering of the product microstructure produced surprisingly being highly stable and being retained not only after the reheating and thawing, but even withstanding heat sterilization, for example in the form of customary autoclaving at 121° C. for 20 min. Attempts to produce a comparable microstructure by very fine grinding/micronizing at various pressures have shown, in addition, that a corresponding microstructure cannot be produced mechanically, but this forms only in the course of a physicochemical process under conditions as are described by way of example in the present application.

EXAMPLE

The invention will be described in more detail below with reference to an example and figures which describe various product properties changed by the freeze-texturizing.

The invention will be described in more detail below with reference to experimental results which are based on one and the same starting mixture comprising skimmed milk, fat, sugar, sucrose syrup, skimmed-milk powder, xanthan, crystalline cellulose and ι-carrageenan.

Example 1

Sugar, xanthan, ι-carrageenan, microcrystalline cellulose, skimmed-milk powder and vanilla aroma were dissolved or dispersed in skimmed milk in the amounts reported below. The mixture is homogenized at 220 bar and then subjected to a UHT sterilization at 136° C. for 30 s.

The composition of the end product was as follows:

| | |
|---|---|
| Skimmed milk | 79% by weight |
| Sugar | 13% by weight |
| Skimmed-milk powder | 3.6% by weight |
| Xanthan | 0.1% by weight |
| l-Carrageenan | 0.3% by weight |
| Microcrystalline cellulose | 1% by weight |
| Sucrose syrup | 3% by weight |
| Vanilla aroma | 0.04% by weight |

The starting mixture presterilized as described was cooled to 4° C. and divided into subquantities which were further processed in two different ways:

A first subquantity was permitted to develop its customary product structure directly as usual under shearing.

A second subquantity was additionally subjected to an inventive freeze-texturizing, by adding the starting mixture at a starting temperature of 4° C. to a coolable stirring vessel in which the starting mixture was cooled with stirring to a final product temperature of −5° C. The resultant flowable product was aseptically packed into cups which were sealed and stored at +4° C., the frozen proportions of free water thawing out and the product being obtained in its final structure.

The characteristics of the product which was freeze-texturized by cooling and reheating were compared with those of the product prepared in a customary manner from the first subquantity of the starting mixture.

The differing product characteristics are shown comparatively in FIGS. 1 to 4 pictorially and in diagram form.

The test methods employed were as follows:
a) microscopic examination with transmitted light: for this approximately 5-10 mg of product were applied with a teaspoon to a slide of dimensions 76×26×1 mm (marketed by Marienfeld; Article No. 10 000 000) and pressed flat with a cover slide measuring 24×50 mm (marketed by Marienfeld, Article No. 1). The sample thus prepared was then analyzed using a suitable transmitted light strength.
b) Fluorescence microscopy study after staining with Nile Red and ANS, photographed with light of the wavelengths associated with the dye used;
c) measurement of phase angle: Vane geometry (diameter 18 mm, length 50 mm, strain 0.8 Pa), measured using a Haake RS 150; the phase angle is given as arctan G''/G'.

Figure 1B:
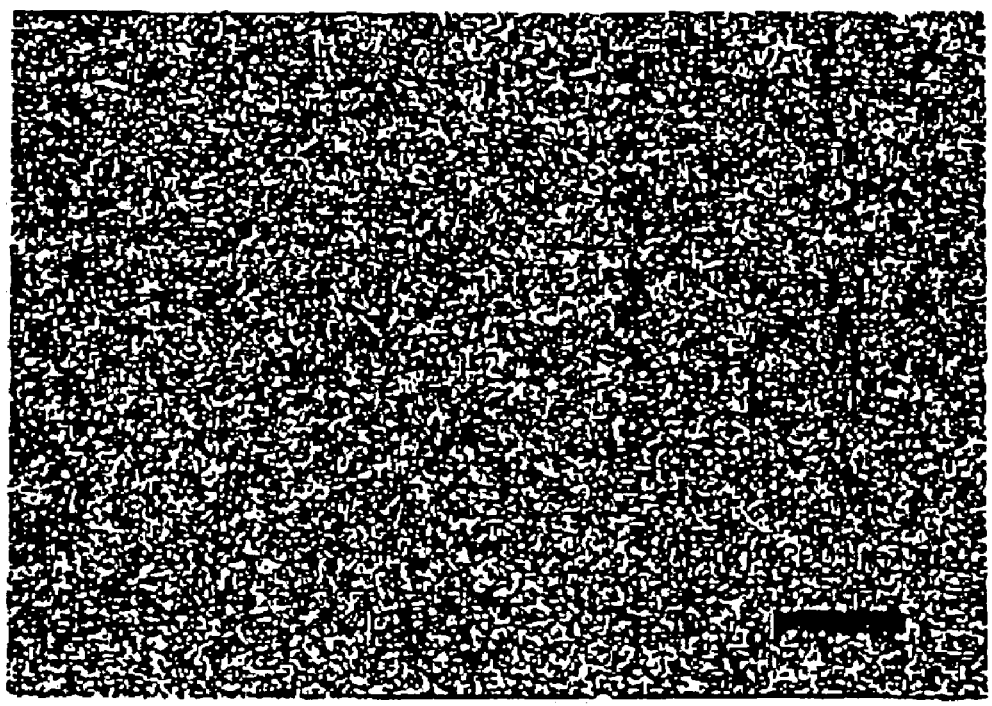

As demonstrated by the two FIGS. 1a (product structured conventionally by mixing) and FIG. 1b (product freeze-texturized according to the invention), which show light micrographs under transmitted light using an Olympus BH-2 microscope, it is clear that the product structured by the customary process according to FIG. 1a exhibits the typical phase separation of the differing mixture constituents such as proteins and other biopolymers, recognizable as relatively coarse clusters of differing color. In contrast, the freeze-texturized product according to FIG. 1b exhibits a very much finer and more homogeneous structure without discernible coarse clusters, which in the light micrograph appears rather like the structure of a structured parchment paper or an ice coating on a windowpane. The optically recognizable differences are so clear that it may be assumed that a product freeze-texturized by the inventive method may always be differentiated without problems from a product which was produced from the same starting mixture by conventional mixing and if appropriate high-pressure homogenization.

Figure 2A:
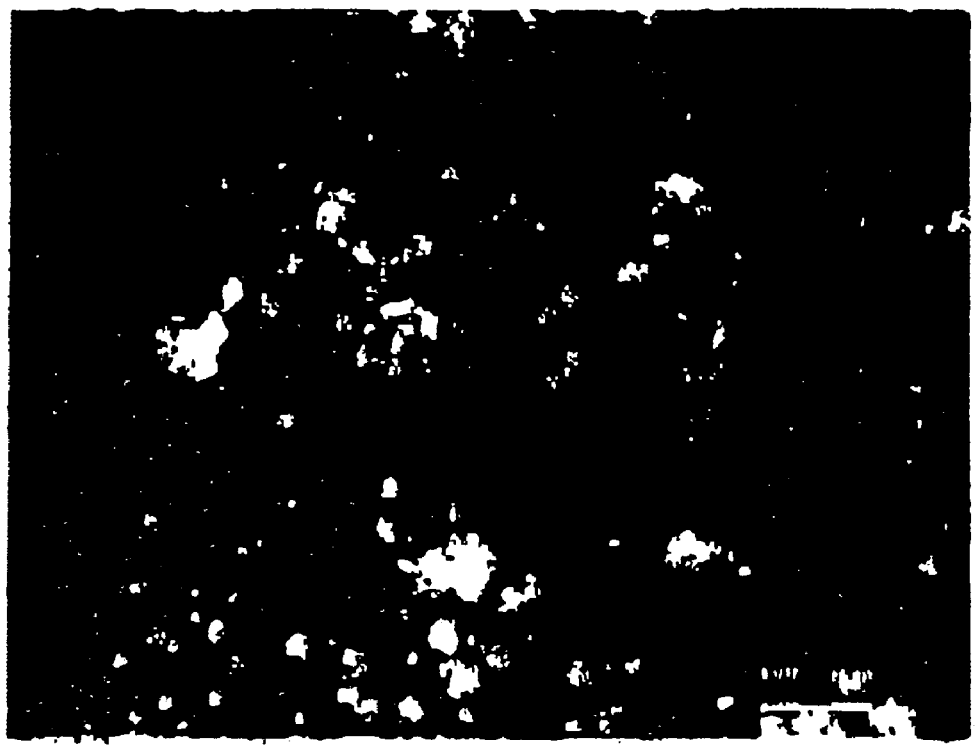
FIGS. 2a and 2b show the same products produced by the customary method (FIG. 2a) or the inventive method (FIG. 2b) as in FIGS. 2a and 2b, but in the form of fluorescence microscopy photographs.
Figure 2B:
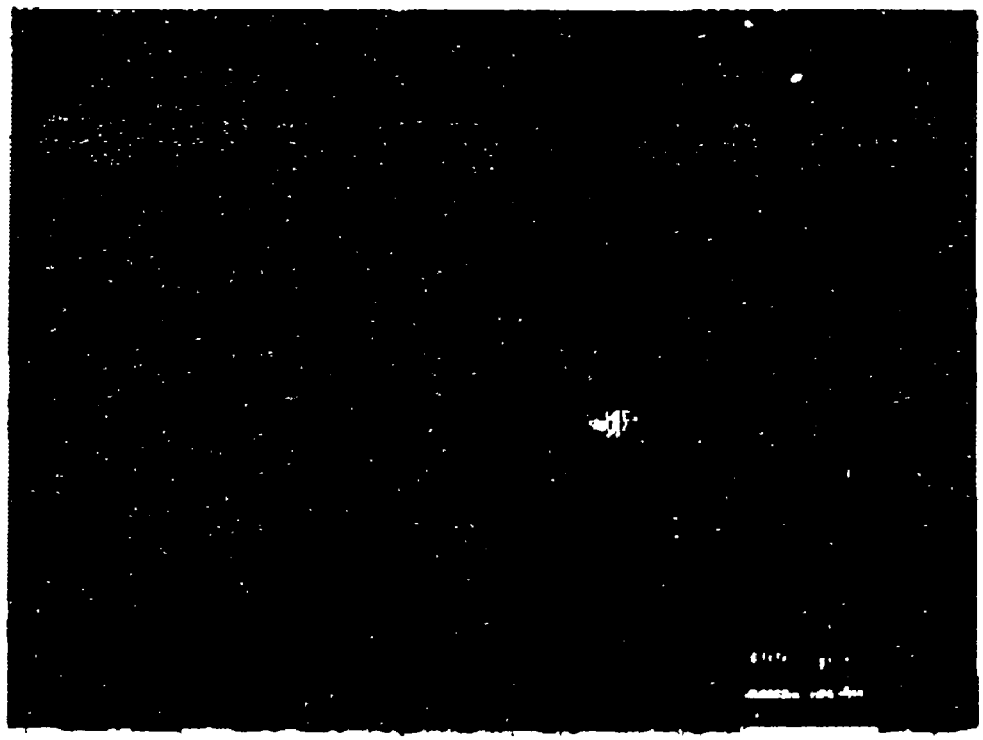

Similar differences may also be seen in the fluorescence micrographs according to FIG. 2. For the fluorescence micrographs, the proteins and fats of the starting mixture were stained (Nile Red and ANS), and the product sample was rated visually under light of a wavelength appropriate to the respective dyes. Again, in the case of the conventional product (FIG. 2a), coarse-grained, cluster-like structures may be seen, while in the case of the inventively freeze-texturized product no clear structures are recognizable, but rather a much more homogeneous distribution of the individual constituents in fine grained form, recognizable by differing brightness shadowing (actually color shadowing).

Figure 3:
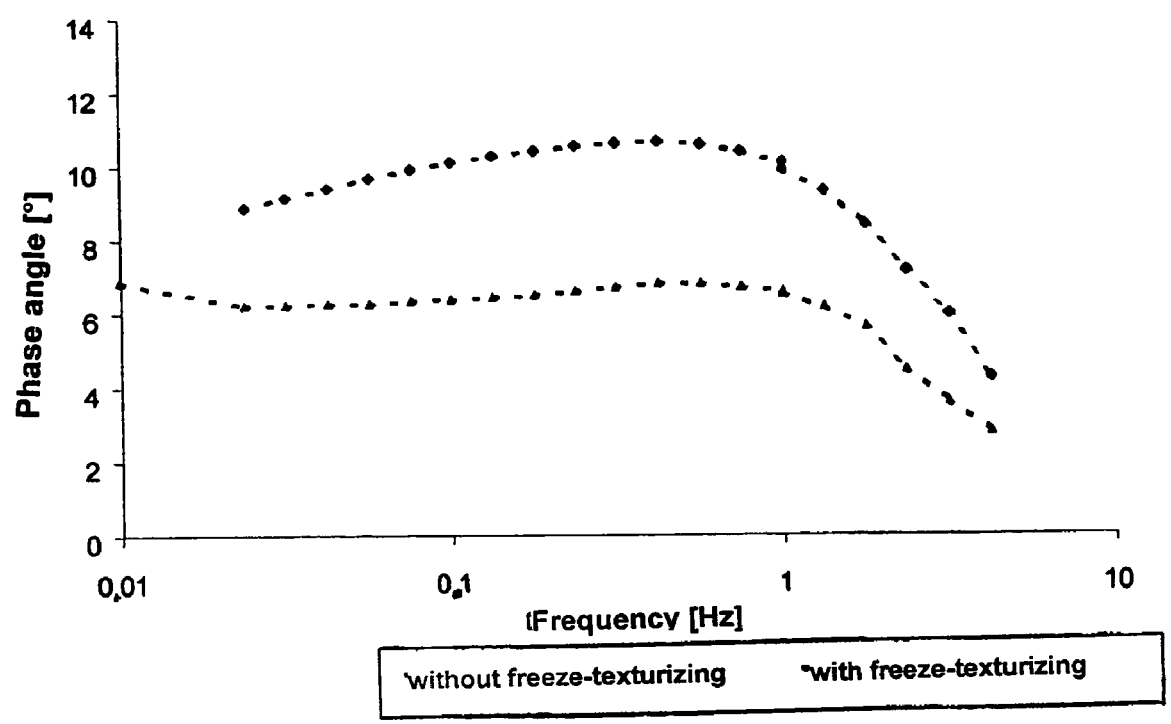
FIG. 3 shows a diagram which shows the changes caused by the freeze-texturizing in the phase angle of products of the same starting mixture as in the preceding figures.
Figure 4:
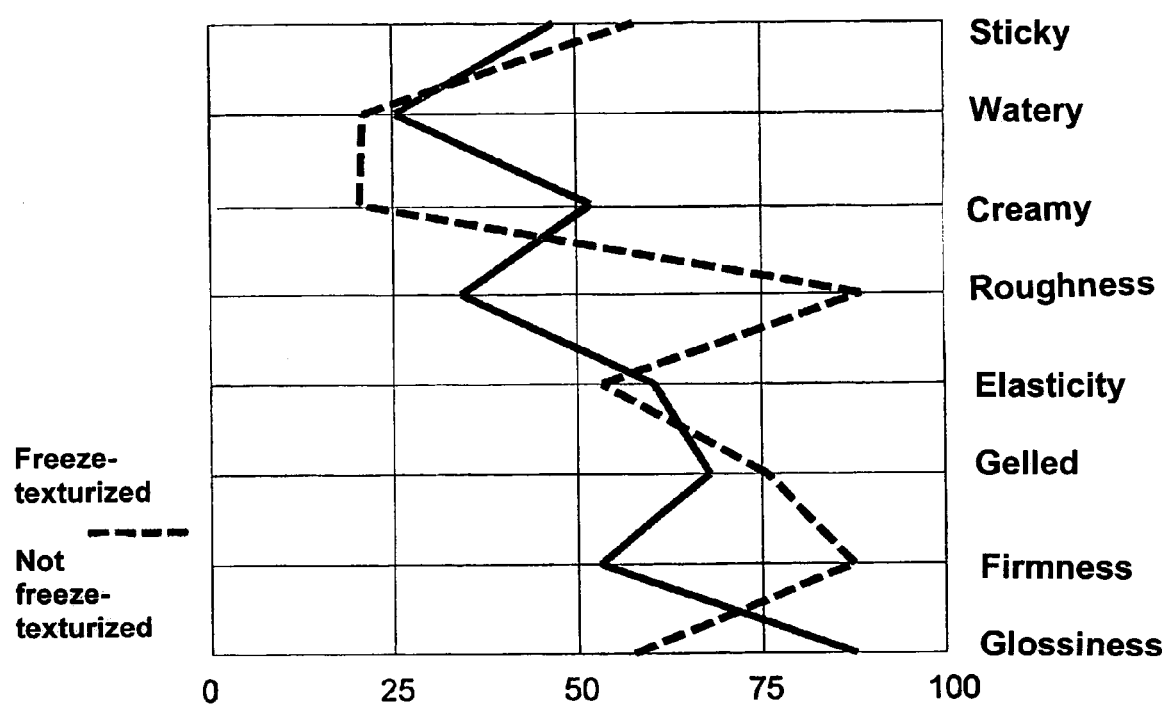
FIG. 4 shows the changes in product characteristics due to freeze-texturizing according to a scale of ratings of products from an identical starting mixture made by a panel of 10 sensory testers.

Measurement of phase angle according to FIG. 3 also shows marked differences between a freeze-texturized product and a product conventionally produced by mixing. For the freeze-texturized product (lower curve), a markedly lower phase angle is measured, which indicates that an inventively freeze-texturized product is more elastic and a higher structural order has developed. For those skilled in the art, the differences in phase angle indicate completely differing structures.

The different products were, in addition, subjected to a sensory rating by a panel of 10 trained sensory testers for desserts, the same samples being evaluated from which the different images of FIGS. 1 and 2 had been made. It may be seen that the inventively freeze-texturized product differs statistically significantly in particular in the product characteristics creamy structure, roughness, firmness and glossiness from a product prepared customarily by mixing, which was less creamy, and so markedly rougher and firmer, and had a lower glossiness.

In addition, it was observed in series testing with the above recipe that the effect of freeze-texturizing was not obtained until a pronounced threshold temperature had been passed, which was −3.5° C. This temperature corresponds to an amount of 50% ice crystals in the free water present in the mixture (which makes up 80% of the total amount of detectable water).

Marked differences between the products were also found in the case of further studies using DSC (differential scanning calorimetry), more precisely especially in the case of the crystallization temperatures. The crystallization temperature of the non-freeze-texturized product was −16.1° C., while that for the freeze-texturized product was considerably lower at −21.4° C. The difference between these values shows that in the case of both products the free water present is distributed in the foodstuff matrix in a different way.

Clearly a part of the free water in the freeze-texturized product is bound very much more closely to the constituents of the foodstuff than in the conventional product.

The freeze-texturized product of the present invention is not to be significantly aerated during stirring under shearing conditions. Freezing under stirring and thawing are solely to develop the desired product structure. However, it is within the field of the invention to foam a product produced in this manner subsequently by gas introduction or to convert it into an aerated dish by mixing with a foam.

What is claimed is:

1. A foodstuff having creamy to pasty characteristics comprising constituents including one or more biopolymers and water and having a homogeneous microstructure produced by freeze texturing, wherein the biopolymers are present in a very fine microscopic distribution and wherein the foodstuff is obtained by
    mixing the constituents of the foodstuff to form a flowable starting mixture having a liquid to pasty consistency,
    cooling the starting mixture to a product temperature of less than 0° C. with simultaneous continuous mixing without aeration to obtain a freeze-texturized homogenous mixture of all constituents, and
    allowing the temperature of the homogenous mixture obtained to rise to a temperature of 4° C. and above.

2. The foodstuff of claim 1 further comprising one or more constituents selected from the group consisting of nutrients, flavorings, aromas, colorings, structure-forming agents, dietary fibers and combinations thereof.

3. The foodstuff of claim 2, wherein the biopolymers are proteins or polysaccharides and wherein aqueous constituents in the form selected from the group consisting of milk, aqueous solutions of the biopolymers, aqueous solutions of the constituents and combinations thereof are incorporated into the starting mixture.

4. The foodstuff of claim 3, wherein the proteins are milk proteins and the polysaccharides are hydrocolloids.

5. foodstuff of claim 4, wherein the hydrocolloids are xanthan, carrageenan, or microcrystalline cellulose, the biopolymers are present in an amount in the range from 0.01 to 30% by weight, and optionally containing fats in an amount of up to 30% by weight of the foodstuff.

6. foodstuff of claim 1, in the form of a creamy mixture.

7. The foodstuff of claim 1, in the form of a sweet cream dessert or a cream product having a savory or spicy flavor.

8. The foodstuff of claim 1, having a phase angle of at least 8 degrees over a frequency of between 0.1 and 1 Hz.

9. The foodstuff of claim 1, wherein the foodstuff is filled aseptically and has been preserved by a process selected from the group consisting of sterilizing the starting mixture, sterilizing the freeze-textured homogenous mixture and combinations thereof.

10. The foodstuff of claim 9, wherein the sterilizing is performed by a technique selected from the group consisting of in-pack sterilization, pasteurization in an autoclave and combinations thereof.

* * * * *